United States Patent
Chen et al.

(10) Patent No.: US 10,248,104 B2
(45) Date of Patent: Apr. 2, 2019

(54) OPTIMIZING MACHINE OPERATIONS USING ACOUSTICS PROPERTIES

(71) Applicant: Industrial Technology Research Institute, Hsinchu OT (TW)

(72) Inventors: Yi-Hsuan Chen, Hsinchu (TW); Ta-Jen Peng, Hsinchu (TW); Yi-Ming Chen, Hsinchu (TW); Shu-Chung Liao, Hsinchu (TW); Sheng-Ming Ma, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 203 days.

(21) Appl. No.: 15/331,545

(22) Filed: Oct. 21, 2016

(65) Prior Publication Data
US 2018/0052439 A1    Feb. 22, 2018

(30) Foreign Application Priority Data
Aug. 17, 2016 (TW) ............................. 105126220 A

(51) Int. Cl.
G05B 19/402 (2006.01)
G05B 19/18 (2006.01)
G05B 19/4065 (2006.01)

(52) U.S. Cl.
CPC .......... *G05B 19/402* (2013.01); *G05B 19/182* (2013.01); *G05B 19/4065* (2013.01);
(Continued)

(58) Field of Classification Search
CPC ................ G05B 19/402; G05B 19/182; G05B 2219/49178; G05B 2219/49077
See application file for complete search history.

(56) References Cited

U.S. PATENT DOCUMENTS 3,784,798 A * 1/1974 Beadle ............... G05B 19/4163
                                                    700/173
4,724,524 A * 2/1988 Thomas ............. G05B 19/4065
                                                    340/680

(Continued)

FOREIGN PATENT DOCUMENTS

CN    101334656 A    12/2008
CN    102736561 A    10/2012

(Continued)

OTHER PUBLICATIONS

Altintas, Yusuf, "Manufacturing Automation: Metal Culling Mechanics," Machine Tool Vibrations, and CNC Design, 2012, pp. 160-161 and 332-334.

(Continued)

*Primary Examiner* — Mohammad Ali
*Assistant Examiner* — Kelvin Booker
(74) *Attorney, Agent, or Firm* — Mintz Levin Cohn Ferris Glovsky and Popeo, P.C.; Peter F. Corless; Steven M. Jensen

(57) ABSTRACT

A remote machining optimization system for a machine tool is provided, which includes an input unit configured to input a machining parameter including a spindle speed and a cut depth; a receiving unit configured to receive sound signals and vibration signals from the machine tool; a processing unit configured to generate a machining program with a program generating module, to modify the spindle speed and the cut depth according to the sound signals with a speed optimization module and a depth optimization module, respectively; a communication unit configured to send the machining program to the machine tool; and a storage unit configured to store the modified spindle speed and the cut depth.

7 Claims, 2 Drawing Sheets

(52) U.S. Cl.
CPC .............. *G05B 2219/33284* (2013.01); *G05B 2219/37337* (2013.01); *G05B 2219/37351* (2013.01); *G05B 2219/49077* (2013.01); *G05B 2219/49178* (2013.01)

(56) References Cited

U.S. PATENT DOCUMENTS

| | | | | |
|---|---|---|---|---|
| 4,759,243 | A * | 7/1988 | Thompson | B23Q 15/12 82/1.11 |
| 4,806,914 | A * | 2/1989 | Thomas | G01H 1/16 340/680 |
| 5,187,669 | A * | 2/1993 | Wildes | G05B 19/18 700/175 |
| 5,549,190 | A * | 8/1996 | Turchan | B23B 31/001 198/403 |
| 6,085,121 | A * | 7/2000 | Stern | B23Q 17/12 340/680 |
| 6,161,055 | A * | 12/2000 | Pryor | G05B 19/4065 382/152 |
| 6,810,302 | B2 * | 10/2004 | Darcy, Jr. | G05B 19/4097 700/182 |
| 7,177,713 | B2 * | 2/2007 | Smith | G06Q 10/06 235/376 |
| 7,209,799 | B2 * | 4/2007 | Agapiou | G05B 19/41875 700/121 |
| 7,451,013 | B2 * | 11/2008 | Coleman | G05B 19/40937 700/159 |
| 7,930,957 | B2 * | 4/2011 | Travez | B23Q 15/12 82/118 |
| 7,933,679 | B1 * | 4/2011 | Kulkarni | G05B 13/0265 700/173 |
| 8,781,982 | B1 * | 7/2014 | Das | G06E 1/00 706/21 |
| 8,847,114 | B1 * | 9/2014 | Shin | B23K 26/02 219/121.71 |
| 8,965,485 | B2 * | 2/2015 | Balaji | A61B 17/32 600/429 |
| 9,833,868 | B2 * | 12/2017 | Hwang | B23Q 17/0976 |
| 9,956,661 | B2 * | 5/2018 | Hwang | B23Q 15/12 |
| 2007/0067059 | A1 * | 3/2007 | Travez | B23Q 15/12 700/160 |
| 2014/0297021 | A1 * | 10/2014 | Aggarwal | G05B 19/40937 700/160 |
| 2016/0144474 | A1 * | 5/2016 | Hwang | B23Q 15/12 700/173 |
| 2017/0060116 | A1 * | 3/2017 | Liao | G05B 19/402 |
| 2017/0100810 | A1 * | 4/2017 | Hwang | B23Q 17/0976 |
| 2017/0235293 | A1 * | 8/2017 | Shapiro | B23K 37/0235 700/166 |
| 2017/0252884 | A1 * | 9/2017 | Busi | B23B 29/04 |
| 2018/0126507 | A1 * | 5/2018 | Rivers | B23Q 17/2233 |

FOREIGN PATENT DOCUMENTS

| | | |
|---|---|---|
| CN | 102929210 A | 2/2013 |
| CN | 104298173 A | 1/2015 |
| JP | 2015-100879 A | 6/2015 |
| TW | I268196 B | 12/1995 |
| TW | I289092 B | 11/2007 |
| TW | M368863 U | 11/2009 |
| TW | 201008700 A | 3/2010 |
| TW | M449656 U | 4/2013 |
| TW | I395636 B | 5/2013 |
| TW | I517934 B | 5/2013 |
| TW | I426364 B | 2/2014 |
| TW | I430199 B | 3/2014 |
| TW | 201545833 A | 12/2015 |
| TW | I518469 B | 1/2016 |

OTHER PUBLICATIONS

Quintana, Guillem, "Chatter in machining processes: A review," International Journal of Machine Tools and Manufacture, May 2011, vol. 51, Issue 5, pp. 363-376.

R. Tetia et al., "Advanced monitoring of machining operations," CIRP Annals—Manufacturing Technology, Jul. 1, 2010, vol. 59, Issue 2, pp. 717-739, Jul. 1, 2010.

M. Morris et al., "Development of remote monitoring and maintenance systems for machine tools,"CIRP Annals—Manufacturing Technology, May 9, 2008, vol. 57, Issue 1, pp. 433-436, May 9, 2008.

Mori, M. and Fujishima, M., "Remote Monitoring and Maintenance Systems for CNC Machine Tools," Procedia CIRP, Oct. 14, 2013, vol. 12, 2013, pp. 7-12, Oct. 14, 2013.

Cao, Hongrui, et al., "Chatter identification in end milling processusing wavelet packets and Hilbert-Huang transform," International Journal of Maching Tools and Manufacture, Mar. 5, 2013, vol. 69, Jun. 2013, pp. 11-19.

Y. Kuo, "Prediction of Regenerative Chatter in Vertical CNC Milling Process," Department of Mechanical Engineering, College of Engineering, National Taiwan University, Master Thesis, Jul. 2015.

* cited by examiner

OPTIMIZING MACHINE OPERATIONS USING ACOUSTICS PROPERTIES

CROSS-REFERENCE TO RELATED APPLICATION

This application claims under 35 U.S.C. § 119(a) the benefit of Taiwanese Patent Application No. 105126220 filed Aug. 17, 2016, the entire contents of which are incorporated herein by reference.

TECHNICAL FIELD

The present disclosure relates to machining optimization systems and methods, and, in particular, to a machining optimization system and method for machine tools by a remote network platform.

BACKGROUND

Machining parameters of general machine tools, such as the principal axis spindle speed, the cut depth, or the feeding speed of the cutting tools, are generally set by artificial experience or by trial and error method, which not only cannot play the maximum effectiveness of the equipment should have, once an abnormal or unknown vibration occurs, the machine tools may need to be repaired or tested for several times by the maintenance or testing personnel, until they find the optimum setting, this will cause the problems of time consuming but in vain, inefficient and time delay.

Therefore, it is very important and urgent to provide an optimization system and method for machining parameters of machine tools by the remote network platform.

SUMMARY

The present disclosure provides a remote machining optimization system for a machine tool, comprising: an input unit configured to input a machining parameter including a spindle speed and a cut depth; a receiving unit configured to receive a sound signal and a vibration signal from the machine tool; a processing unit including: a program generating module configured to generate a machining program according to the machining parameter inputted by the input unit; a speed optimization module configured to modify the spindle speed according to the sound signal received by the receiving unit; and a depth optimization module configured to modify the cut depth according to the sound signal received by the receiving unit; a communication unit configured to send the machining program generated by the program generating module to the machine tool; and a storage unit configured to store the spindle speed and the cut depth modified by the speed optimization module and the depth optimization module, respectively.

The present disclosure provides another remote machining optimization system for a machine tool, comprising: an input unit configured to input a machining parameter including a spindle speed and a cut depth; a network interface configured to receive a sound signal and a vibration signal from the machine tool; a processing unit including: a program generating module configured to generate a machining program according to the machining parameter inputted by the input unit; a speed optimization module configured to modify the spindle speed according to the sound signal received by the network interface with the machining program sent to the machine tool through the network interface; and a depth optimization module configured to modify the cut depth according to the sound signal received by the network interface; and a storage unit configured to store the spindle speed and the cut depth modified by the speed optimization module and the depth optimization module, respectively.

The present disclosure further provides a remote machining optimization method for a machine tool, comprising: receiving a machining parameter including a spindle speed and a cut depth from the machine tool; generating a machining program according to the machining parameter; sending the machining program to the machine tool; executing the machining program; receiving a sound signal and a vibration signal from the machine tool; and executing speed optimization to determine whether chatter occurs.

DETAILED DESCRIPTION

The following instructions provide a number of different embodiments or examples to implement different features of the present disclosure. The components and the arrangement described in the following specific embodiments are only for the brief introduction of the present disclosure, which, only as embodiments, and are not used to limit the present disclosure.

As would be appreciated by an ordinarily skilled artisan, in each of the steps in the method of the following embodiments, additional steps may be added prior to and after each step, and some of the steps may be replaced, deleted, or moved.

Figure 1:
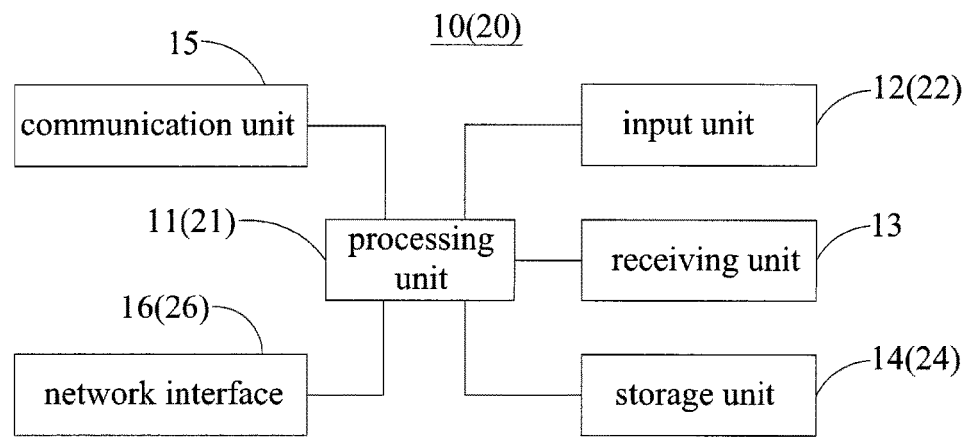
FIG. 1 is a system architecture diagram of a remote machining optimization system according to the present disclosure.

FIG. 1 is a system architecture diagram of a remote machining optimization system 10 according to the present disclosure. The remote machining optimization system 10 is suitable for one or more (such as two, three, four or more) machining tools, and includes, for example, a processing unit 11, an input unit 12, an receiving unit 13, a storage unit 14, a communication unit 15, and a network interface 16 which are interconnected with one another. The processing unit 11 is, for example, a processor capable of mathematical operations and logical judgment. The input unit 12 is, for example, a device or interface which supports input function, such as instruction, program code, or data. The receiving unit 13 is, for example, a device or interface for receiving various sensing signals. The storage unit 14 is, for example, a media or circuit of fixed or mobile mode to storage data. The communication unit 15 is, for example, a circuit for sending or receiving control signals of the driving devices. The network interface 16 is, for example, an interface circuit of various network communications.

FIG. 1 also shows another remote machining optimization system 20 according to the present disclosure. The remote machining optimization system 20 is suitable for one or more machine tools 3, and includes, for example, a processing unit 21, an input unit 22, a storage unit 24, and a network interface 26 which are interconnected with one another. The category and the function of the processing unit 21, the input unit 22, the storage unit 24 and the network interface 26 can be selectively the same or similar to the processing unit 11, the input unit 12, the storage unit 14 and the network interface 16 as mentioned above, respectively.

Figure 2:
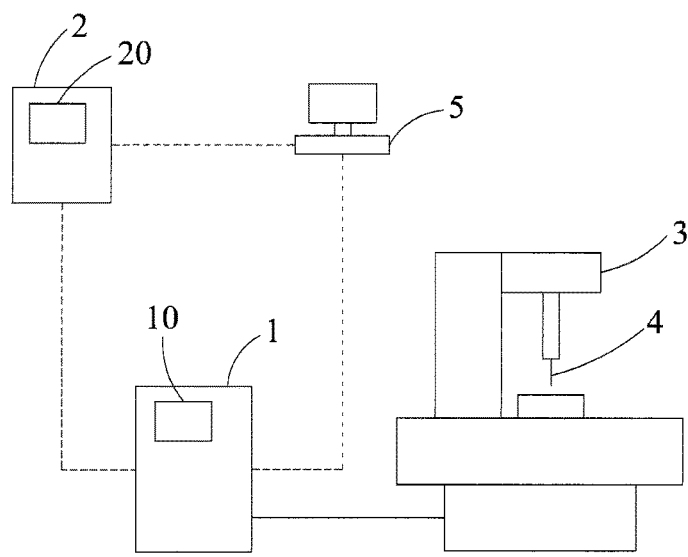
FIG. 2 is an implementation arrangement diagram of a remote machining optimization system according to the present disclosure.

FIG. 2 is an implementation arrangement diagram of the remote machining optimization system 10 according to the present disclosure. In an embodiment, the remote machining optimization system 10 is arranged or integrated in the controller 1 of one or more machine tools 3, and can cooperate with the existing components of the controller 1, such as the processor, communication module, storage module, input/output module, display, etc. The controller 1 is connected to and controls the machine tools 3. The remote machining optimization system 10 also has the same control capability as the controller 1 to control the machine tool 3. By using the terminal 5, the maintenance or testing personnel can log on to a network interface 16 of the remote machining optimization system 10 to execute the machining optimization operations, as shown in the dotted line of FIG. 2. The remote machining optimization system 10 can also be selectively integrated in the terminal 5.

FIG. 2 also shows the remote machining optimization system 20 arranged or integrated in the remote host 2. Similarly, the remote machining optimization system 20 also can cooperate with the existing components of the remote host 2. The remote host 2 can be connected to a single or multiple controllers 1 through the network interface 16(26), as show in the dotted line of FIG. 2, to centrally execute the remote operations of receiving, sending, processing and managing of various data. By using the terminal 5, the maintenance or testing personnel also can log on to the network interface 26 of the remote machining optimization system 20 to execute the machining optimization operations, as shown in the dotted line of FIG. 2.

Figure 3:
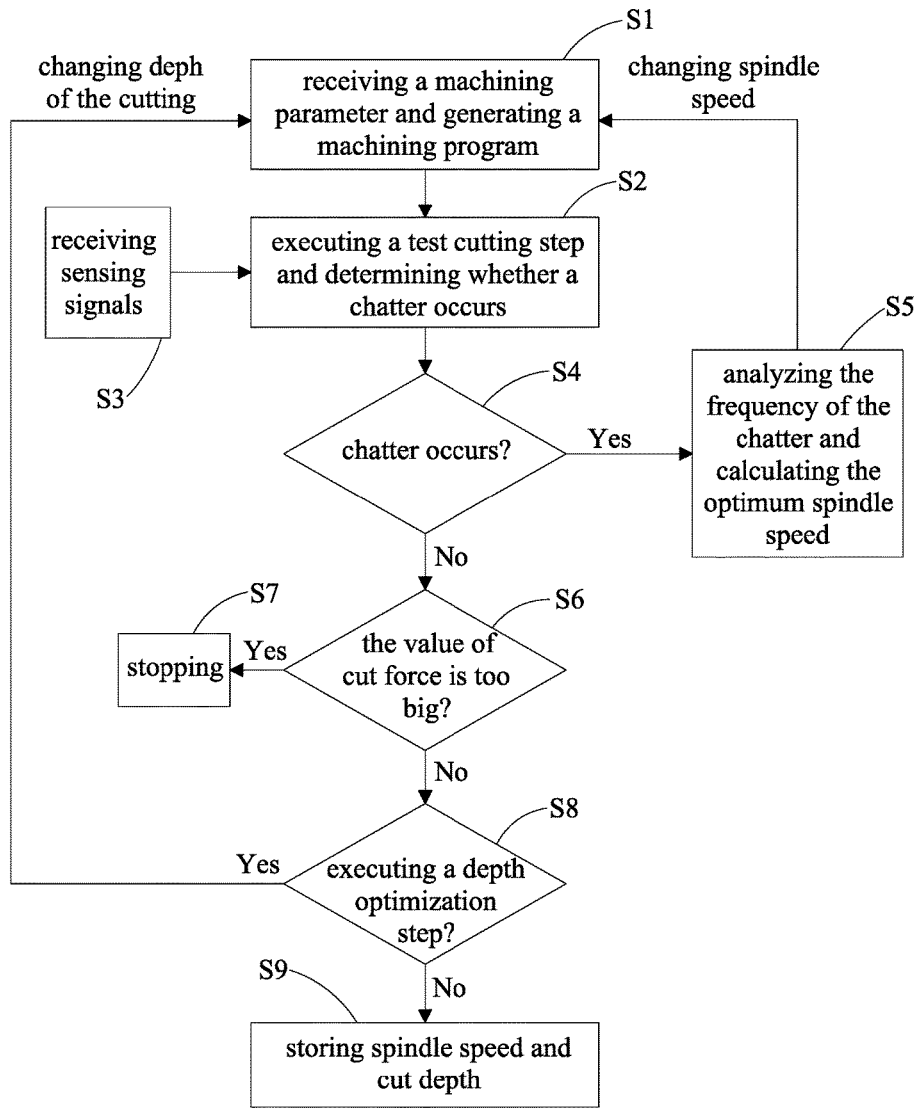
FIG. 3 is a flow chart of a remote machining optimization method according to the present disclosure.

FIG. 3 is an implementation flow chart of a remote machining optimization method according to the present disclosure. Please refer to FIG. 3 together with FIGS. 1 and 2. The implementation situation is: when the cutting tool 4 is arranged on the machine tool to be machined, the maintenance or testing personnel will input the machining parameter of the test cutting, such as the principal axis spindle speed, the cut depth, the feeding speed, the cycle number of test, the tolerance value of the cutting tools, etc. of the cutting tool 4 to the storage unit 14(24) for storage through the input unit 12(22) or the network interface 16(26), as shown in step S1. After reading the machining parameter inputted by the input unit 12(22) or the network interface 16(26), a program generating module established by firmware or software in the processing unit 11(21) will convert the above machining parameter into a machining program, such as a numerical control (NC) code, send the machining program converted or generated by the program generating module to the controller 1 of the machine tool 3 through the communication unit 15 or the network interface 26, and store the machining program in the storage unit 14(24).

When receiving the machining program, the controller 1 will execute a test cutting of the removable part to the informal material or formal workpiece with the same material (not shown) according to the instructions of the machining program, as shown in step S2. The receiving unit 13 or the network interface 26, along with the cutting step, will begin to receive the signals for sensing the cutting tool 4, as shown in step 3. The signals, including sound signals and vibration signals, are sensed and sent by a variety of sensing devices (not shown), which are arranged on a peripheral position of the cutting tool 4 or on an appropriate position of the machine tool 3.

When the receiving unit 13 or the network interface 26 begins to receive the sound signals of the sensing signals and send them to the processing unit 11(21), a speed optimization module established by firmware or software in the processing unit 11(21) will convert the sound signals into frequency domain signals by fast Fourier transform (FFT) firstly, and then analyze the frequency of the chatter to be generated. When chatter occurs, as shown in step S4, the speed optimization module calculates the speed that is closest to the current speed and can avoid the chatter frequency, and chooses it as the best spindle speed or the target spindle speed to adjust or change, as shown in step S5. The changed spindle speed can be sent to the program generating module to re-generate a new machining program or to modify the original machining program, as shown in step S1. The test cutting continues, as shown in step S2. The cycle number of the adjusting of the spindle speed can be set in advance, until the optimum spindle speed is found.

When no chatter occurs or the spindle speed has been adjusted to the situation that no chatter occurs in test cutting, the cut force is calculated and determined whether it is too great, as shown in step S6. A cut force calculating module established by firmware or software in the processing unit 11(21) calculates the cutting force according to the vibration signals of the sensing signals. In an embodiment, the cut force is the pushing force on the cutting tool 4, the strength of the vibration signals is related to the value of the pushing force. Therefore, the value of the cut force can be calculated. When the value of the cut force is greater than a default value, the remote machining optimization system 10(20) will send a message to suggest or force to stop the execution of test cutting so as to avoid the broken of the cutting tools, as shown in step S7.

If the value of the cut force is still less than the default tolerance value, the cut depth is optimized continuously, as shown in step S8. The so-called cut depth optimization step can refer to gradually increasing or changing the depth of the cutting, which is executed by the depth optimization module established by firmware or software in the processing unit 11(21). The increased or changed value of the depth for each time can be set in advance, and the program generating module generates a new machining program or to modify the original machining program according to the changed value of the cut depth, as shown in step S1. Step S2 and the following cycle test and judgment steps are executed continuously, until the maximum or optimum cut depth is found under the condition of the optimum spindle speed with no chatter occurs. The spindle speed and its corresponding cut depth will be recorded or stored in the storage unit 14(24) to be used as initial settings value or reference values of the machining parameter for the next execution step, as shown in step S9.

After finally finding out the optimum spindle speed and its related cut depth, the remote machining optimization system or method can finish the test cutting, and the new machining parameter will be used to execute the formally work on the formal workpiece.

To sum up, the remote machining optimization system and method of the present disclosure can provide maintenance or testing personnel to test for one or more machine tools, such as the optimization of spindle speed and cut depth, the judgment of the strength of the cut force, etc., through remote host or terminal, which can not only avoid repeated purchase of the system devices, but also can adjust one or more machine tools in a remote way, so as to solve the problems occurred in current machining optimization management.

Although the present disclosure is disclosed by variety of examples mentioned above, however they only for references and not to limit the scope of the present disclosure, it will be understood by those skilled in the art that various changes in form and detail may be without departing from the spirit and scope of the present disclosure.

What is claimed is:

1. A remote machining optimization system for a machine tool, comprising:
   an input unit configured to input a machining parameter including a spindle speed and a cut depth;
   a receiving unit configured to receive a sound signal and a vibration signal from the machine tool;
   a processing unit including:
     a program generating module configured to generate a machining program according to the machining parameter inputted by the input unit;
     a speed optimization module configured to modify the spindle speed according to the sound signal received by the receiving unit; and
     a depth optimization module configured to modify the cut depth according to the sound signal received by the receiving unit;
   a communication unit configured to send the machining program generated by the program generating module to the machine tool; and
   a storage unit configured to store the spindle speed and the cut depth modified by the speed optimization module and the depth optimization module, respectively,
   wherein the speed optimization module is configured to convert the sound signal by fast Fourier transform (FFT) and analyze to find the spindle speed which avoids occurrence of chatter,
   wherein the depth optimization module is configured to increase the cut depth, and
   wherein the processing unit further comprises a cut force calculating module configured to calculate a cut force according to the vibration signal.

2. The remote machining optimization system of claim 1, further comprising a network interface configured to input the machining parameter and send the machining program.

3. The remote machining optimization system of claim 1, wherein the machining program is a numerical control code.

4. A remote machining optimization system for a machine tool, comprising:
   an input unit configured to input a machining parameter including a spindle speed and a cut depth;
   a network interface configured to receive a sound signal and a vibration signal from the machine tool;
   a processing unit including:
     a program generating module configured to generate a machining program according to the machining parameter inputted by the input unit;
     a speed optimization module configured to modify the spindle speed according to the sound signal received by the network interface with the machining program sent to the machine tool through the network interface; and
     a depth optimization module configured to modify the cut depth according to the sound signal received by the network interface; and
   a storage unit configured to store the spindle speed and the cut depth modified by the speed optimization module and the depth optimization module, respectively,
   wherein the speed optimization module is configured to convert the sound signal by fast Fourier transform (FFT) and analyze to find the spindle speed which avoids occurrence of chatter,
   wherein the depth optimization module is configured to increase the cut depth, and
   wherein the processing unit further comprises a cut force calculating module configured to calculate a cut force according to the vibration signal.

5. The remote machining optimization system of claim 4, wherein the machining program is a numerical control code.

6. A remote machining optimization method for a machine tool, comprising:
   receiving a machining parameter including a spindle speed and a cut depth from the machine tool;
   generating a machining program according to the machining parameter;
   sending the machining program to the machine tool;
   executing the machining program;
   receiving a sound signal and a vibration signal from the machining tool;
   executing speed optimization to determine whether chatter occurs;
   when the chatter occurs, modifying the spindle speed and returning to execute the machining program;
   when the chatter does not occur, determining whether to execute depth optimization;
   when it is determined to execute the depth optimization, modifying the cut depth and returning to execute the machining program;
   when it is determined not to execute the depth optimization, storing the spindle speed and the cut depth;
   after executing the speed optimization and prior to executing the depth optimization, calculating a cut force according to the vibration signal;
   when the cut force is not greater than a default value, executing the depth optimization; and
   when the cut force is greater than a default value, stopping executing the machining program.

7. The remote machining optimization method of claim 6, wherein the machining parameter further includes a feeding speed.

* * * * *